(12) United States Patent
Wu

(10) Patent No.: US 6,910,800 B2
(45) Date of Patent: Jun. 28, 2005

(54) BLENDER HAVING A TOP COVER PROVIDED WITH A SWITCH ACTUATING BLOCK

(75) Inventor: Tsan-Kuen Wu, Tainan Hsien (TW)

(73) Assignee: EUPA International Corporation, Las Vegas, NV (US)

( * ) Notice: Subject to any disclaimer, the term of this patent is extended or adjusted under 35 U.S.C. 154(b) by 338 days.

(21) Appl. No.: 10/230,155

(22) Filed: Aug. 29, 2002

(65) Prior Publication Data

US 2004/0042338 A1 Mar. 4, 2004

(51) Int. Cl.[7] .............................................. A47J 43/046
(52) U.S. Cl. ...................... 366/199; 366/205; 366/206; 366/601; 241/37.5; 241/282.1
(58) Field of Search ................. 366/199, 205, 366/206, 601; 241/37.5, 282.1

(56) References Cited

U.S. PATENT DOCUMENTS

| | | | | |
|---|---|---|---|---|
| 3,892,365 A | * | 7/1975 | Verdun ......................... 241/92 |
| 4,216,917 A | * | 8/1980 | Clare et al. ................. 241/37.5 |
| 4,335,860 A | * | 6/1982 | Grandel et al. ............. 241/37.5 |
| 4,506,836 A | * | 3/1985 | Williams .................... 241/37.5 |
| 4,741,482 A | * | 5/1988 | Coggiola et al. ........... 241/37.5 |
| 5,353,697 A | * | 10/1994 | Venturati et al. ............. 99/492 |
| 5,567,049 A | * | 10/1996 | Beaudet et al. ............. 366/206 |
| 6,513,966 B1 | * | 2/2003 | Gort-Barten et al. ....... 366/205 |
| 6,540,394 B2 | * | 4/2003 | Juriga ......................... 366/205 |
| 6,554,466 B1 | * | 4/2003 | Lee ............................. 366/206 |
| 6,629,492 B1 | * | 10/2003 | Li ............................... 99/337 |
| 6,637,681 B1 | * | 10/2003 | Planca et al. .............. 241/37.5 |

FOREIGN PATENT DOCUMENTS

EP        0 571 348 B1 *  9/1995

* cited by examiner

*Primary Examiner*—David Sorkin
(74) *Attorney, Agent, or Firm*—Morgan Lewis & Bockius LLP

(57) ABSTRACT

A blender includes a motor base, a container, and a top cover. The motor base includes a motor unit having a blade driving section, and a contact switch unit connected electrically to the motor unit. The contact switch unit includes a press button that is depressible so as to permit activation of the motor unit. The container has a container bottom provided with a cutting blade unit that is coupled to the blade driving section so as to be driven rotatably by the motor unit. The container has a spring-loaded push rod unit mounted movably thereon. The push rod unit has a bottom rod section associated with the press button of the contact switch unit, and a top rod section depressible by a switch actuating block of the top cover so as to move the push rod unit against biasing action from a deactivating position to an activating position.

6 Claims, 6 Drawing Sheets

BLENDER HAVING A TOP COVER PROVIDED WITH A SWITCH ACTUATING BLOCK

BACKGROUND OF THE INVENTION

1. Field of the Invention

The invention relates to a blender, more particularly to a blender having a top cover that is provided with a switch actuating block.

2. Description of the Related Art

A conventional blender comprises a motor base, a container, and a top cover. The motor base includes a housing, a motor unit mounted in the housing and adapted to be electrically connected to an external power supply, and a control switch for controlling operation of the motor unit. The container is mounted removably on the housing, and has a container bottom that is provided with a cutting blade unit to be driven rotatably by the motor unit, and an open top to be closed by the top cover. When the control switch is operated, the motor unit will be activated to rotate the cutting blade unit for processing food in the container.

To avoid the situation that the motor unit is activated while the cutting blade unit and the motor unit are not properly positioned and fully engaged, which can result in tipping or falling of the container from the motor base, a safety unit is usually provided between the motor base and the container. The safety unit includes a contact switch mounted in the housing and connected electrically to the motor unit. The contact switch has a press button which is accessible from a top side of the housing and which is depressible so as to permit activation of the motor unit. The safety unit further includes a switch actuating block formed on the container bottom. Under the condition that the cutting blade unit and the motor unit are properly positioned and fully engaged, the switch actuating block will be able to apply a pressing force for pressing the press button, thus permitting activation of the motor unit.

Although the aforesaid safety unit guards against undesired activation of the motor unit when the container is not placed in a secured position, another drawback is yet to be resolved. Particularly, when the conventional blender is in use, the top cover may be removed from the container for adding food, such as fruits and vegetables, into the latter. However, when the container is uncovered, the motor unit may still be in an activated state, which exposes the user to the risk of injury due to the rotating blade unit.

SUMMARY OF THE INVENTION

Therefore, the main object of the present invention is to provide a blender that can overcome the aforesaid drawback of the prior art.

Accordingly, a blender of this invention comprises a motor base, a container, and a top cover.

The motor base includes a housing, a motor unit mounted in the housing and having a blade driving section disposed upwardly and outwardly of the housing, and a contact switch unit mounted in the housing and connected electrically to the motor unit. The contact switch unit includes a press button which is accessible externally of the housing and which is depressible so as to permit activation of the motor unit.

The container has an open top and a container bottom opposite to the open top and mounted removably on the housing. The container bottom is provided with a cutting blade unit that is coupled to the blade driving section when the container bottom is mounted on the housing and that is to be driven rotatably by the motor unit. The container has a spring-loaded push rod unit mounted movably thereon. The push rod unit has a bottom rod section associated operably with the press button of the contact switch unit when the container bottom is mounted on the housing, and a top rod section opposite to the bottom rod section and depressible so as to move the push rod unit against biasing action from a deactivating position to an activating position, where the bottom rod section applies a pressing force for pressing the press button to permit activation of the motor unit.

The top cover is mounted removably on the open top of the container and is provided with a switch actuating block that is movable relative to the container so as to engage the top rod section of the push rod unit for moving the push rod unit from the deactivating position to the activating position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
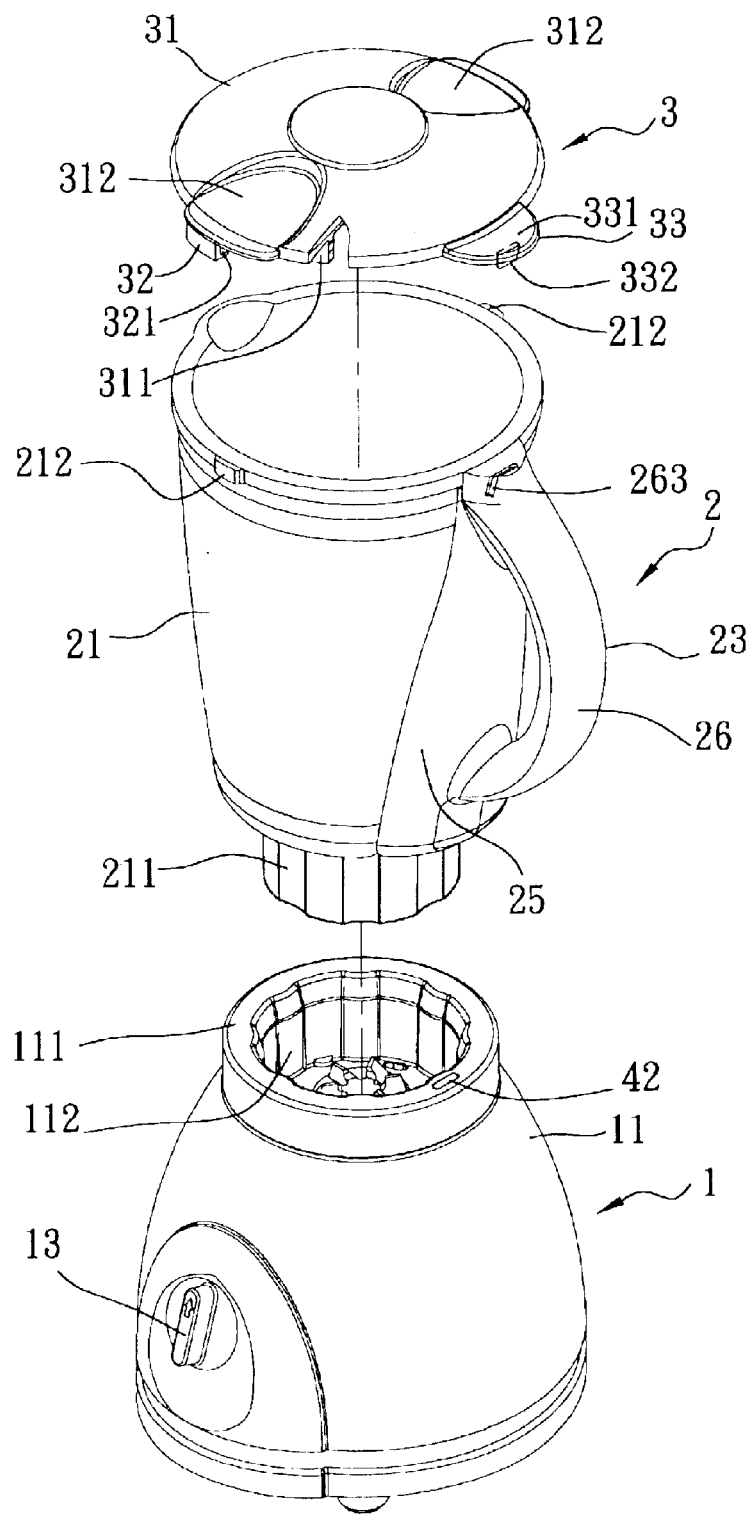
FIG. 1 is a partly exploded perspective view showing a preferred embodiment of a blender according to the present invention.

Referring to FIGS. 1 to 4, the preferred embodiment of a blender according to the present invention is shown to include a motor base 1, a container 2 and a top cover 3.

The motor base 1 includes a housing 11, a motor unit 12, a motor control switch 13, and a contact switch unit 41. The housing 11 has a top side formed with a motor base ring 111 that confines a container coupling cavity 112. The motor unit 12 is mounted in the housing 11 and is connected electrically to an external power supply (not shown). The motor unit 12 has a blade driving section 121, in the form of a rotatable shaft, that is disposed upwardly and outwardly of the housing 11 and that is disposed in the container coupling cavity 112. The motor control switch 13 is mounted on the housing 11 and is connected electrically to the motor unit 12 to control operation of the same in a conventional manner. The contact switch unit 41 is mounted in the housing 11 and is connected electrically to the motor unit 12 and the motor control switch 13. The contact switch unit 41 is conventional in construction and includes a switch body 411 with a spring-loaded contact 412, and a press button 42 having a lower button end abutting against the spring-loaded contact 412, and an upper button end that is accessible externally of the housing 11. In this embodiment, the upper button end of the press button 42 is accessible from a top side of the motor base ring 111. The press button 42 is depressible so as to press the spring-loaded contact 412, thereby enabling the contact switch unit 41 to permit activation of the motor unit 12.

The container 2 includes a container body 21, a cutting blade unit 22, a handle unit 23, and a spring-loaded push rod unit 4. The container body 21 has an open top and a container bottom 211 opposite to the open top and mounted removably on the motor base ring 111 of the housing 11. Two interlocking blocks 212 extend radially and outwardly from the rim of the open top of the container body 21 and are disposed in diametrically opposite positions relative to an axis of the container body 21.

The cutting blade unit 22 includes a coupling axle 221 provided on the container bottom 211 of the container body 21, and a plurality of blades 222 that extend from the coupling axle 221 and that are disposed in the container body 21. The coupling axle 221 is coupled to the blade driving section 121 of the motor unit 12 when the container bottom 211 is secured to the motor base ring 111 in the container coupling cavity 112. As such, the cutting blade unit 22 can be driven rotatably in a conventional manner by the motor unit 12.

The handle unit 23 is mounted on an outer side of the container body 21 and includes a base plate 25 and a grip body 26 connected to the base plate 25. The base plate 25 includes a curved enclosing portion 251, an upper stop portion 252 and a lower stop portion 253. The curved enclosing portion 251 is secured to the outer side of the container body 21 and cooperates with the container body 21 to confine a mounting space therebetween for mounting the push rod unit 4 movably on the container body 21. The lower stop portion 253 and the upper stop portion 252 project from a lower section of the curved enclosing portion 251 into the mounting space and are vertically spaced apart from each other. Each of the upper and lower stop portions 252, 253 is formed with a respective through hole 256. The base plate 25 is further formed with a guide unit 254, in the form of a pair of upright guide plates that project from an upper section of the curved enclosing portion 251 into the mounting space to guide upward and downward movement of the push rod unit 4 relative to the container body 21. A guide block 255 projects from a top end of the curved enclosing portion 251 and is disposed outside the mounting space. In this embodiment, the grip body 26 includes a curved inner grip portion 261 that is integrally connected to the base plate 25, and a curved outer grip portion 262 to be connected to the inner grip portion 261. The outer grip portion 262 has a top part formed with a slot 263. Each of a pair of metal rings 241 is sleeved fixedly on the container body 21. Each of a pair of fasteners 242 secures the handle unit 23 on a respective one of the metal rings 241.

Figure 2:
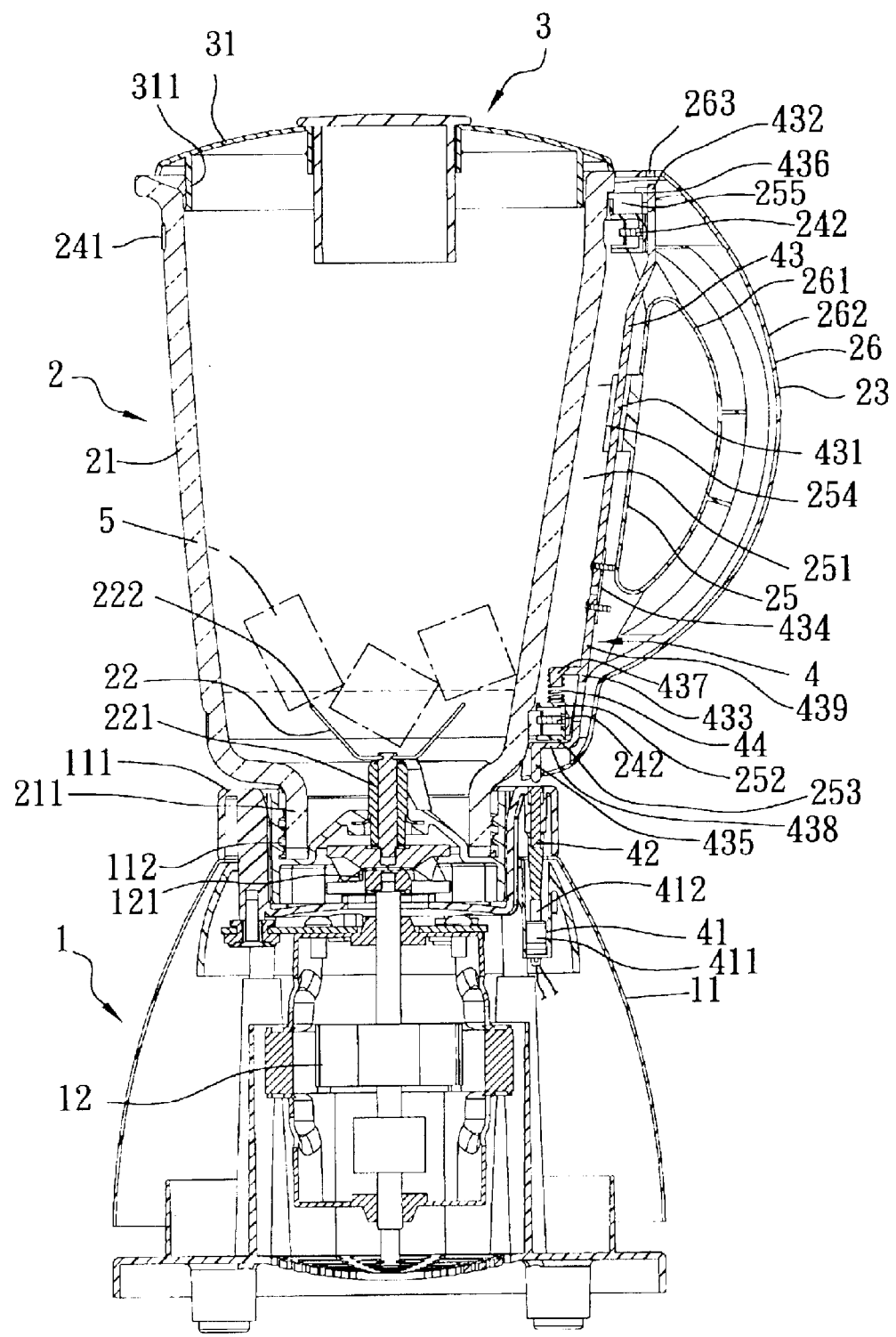
FIG. 2 is a schematic partly sectional view of the preferred embodiment, illustrating a push rod unit thereof in a deactivating state.
Figure 3:
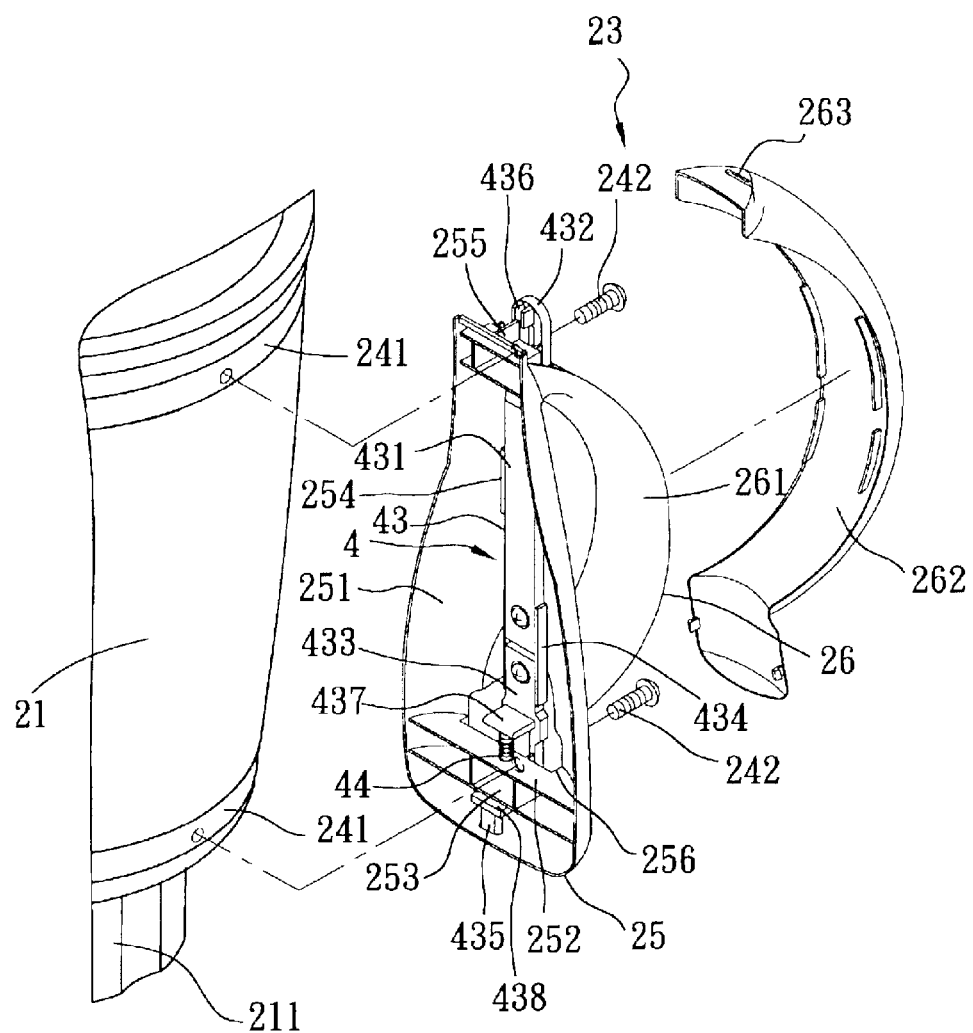
FIG. 3 is a fragmentary exploded perspective view of the preferred embodiment, illustrating how the push rod unit is mounted on a container via a handle unit.
Figure 4:
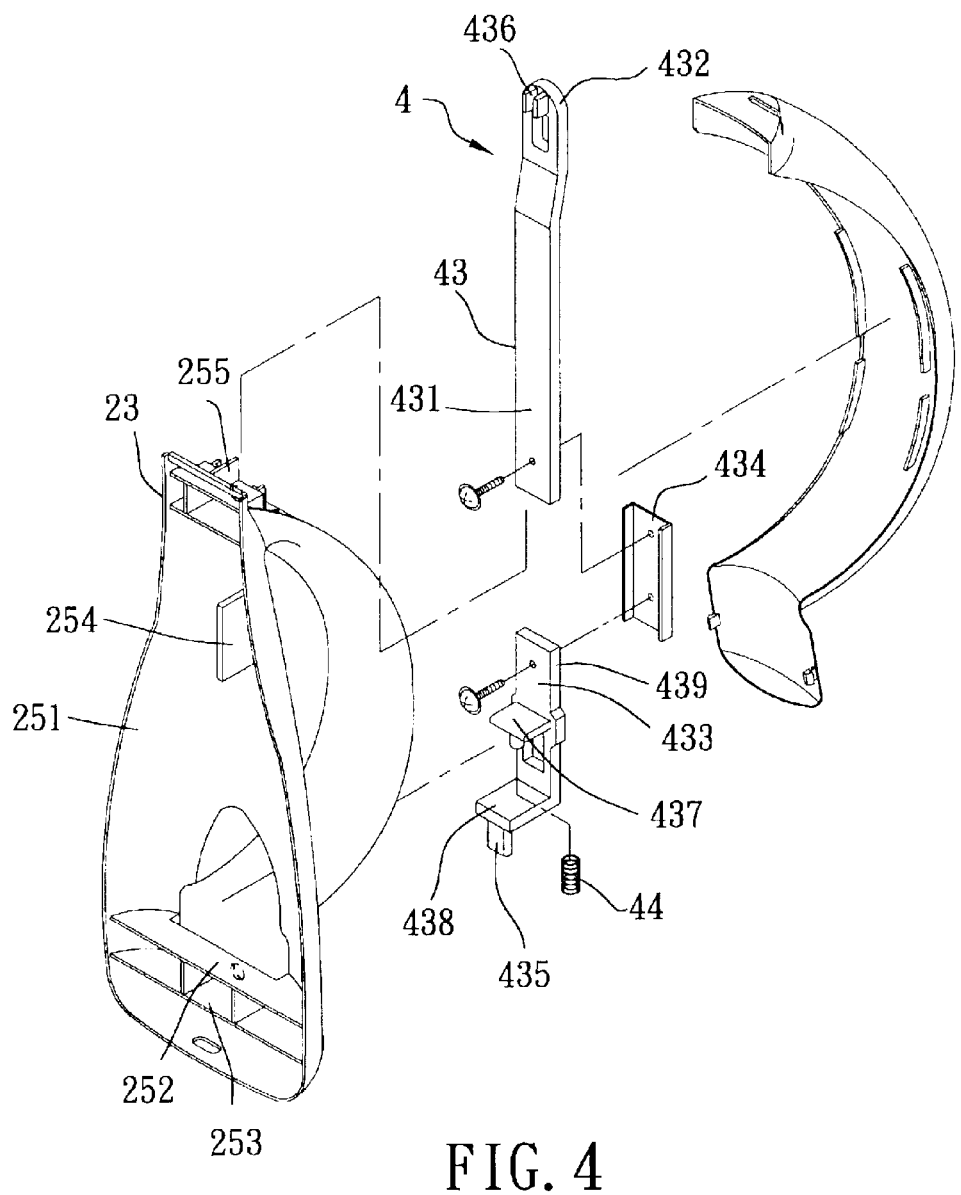
FIG. 4 is a fragmentary exploded perspective view showing the push rod unit and the handle unit of the preferred embodiment.

The spring-loaded push rod unit 4 includes a push rod 43 vertically and movably disposed in the mounting space, and a spring 44. In this embodiment, the push rod 43 is a multi-section rod that includes a bottom rod section 439, a top rod section 432 opposite to the bottom rod section 439, and an intermediate rod section 431 between the top and bottom rod sections 432, 439. The intermediate rod section 431 is slidably confined by the guide unit 254 on the base plate 25. The top and bottom rod sections 432, 439 extend out of the mounting space. The top rod section 432 is formed with a rounded engaging edge, and is further formed with a guide rail 436 for sliding engagement with the guide block 255 on the base plate 25. The bottom rod section 435 includes a connecting portion 433, an upper limit plate 437, a lower limit plate 438, and a push member 435. The connecting portion 433 extends through the holes 256 formed in the upper and lower stop portions 252, 253, and is connected to the intermediate rod section 431 via a coupling plate 434. The upper and lower limit plates 437, 438 project from the connecting portion 433. The upper limit plate 437 is disposed above the upper stop portion 252, whereas the lower limit plate 438 is disposed below the lower stop portion 253. The upper and lower limit plates 437, 438 cooperate with the upper and lower stop portions 252, 253 to form a limit unit that is disposed in the mounting space to limit upward and downward movement of the push rod 43 relative to the container body 21. The spring 44 is mounted between the upper limit plate 437 and the upper stop portion 252 for biasing the push rod 43 upwardly relative to the container body 21 such that the lower limit plate 438 abuts normally against the lower stop portion 253. The push member 435 extends from the lower limit plate 438 and outwardly of the mounting space, as best shown in FIG. 2. When the container bottom 211 is mounted on the housing 11, the push member 435 is registered with the press button 42 of the contact switch unit 41.

Figure 5:
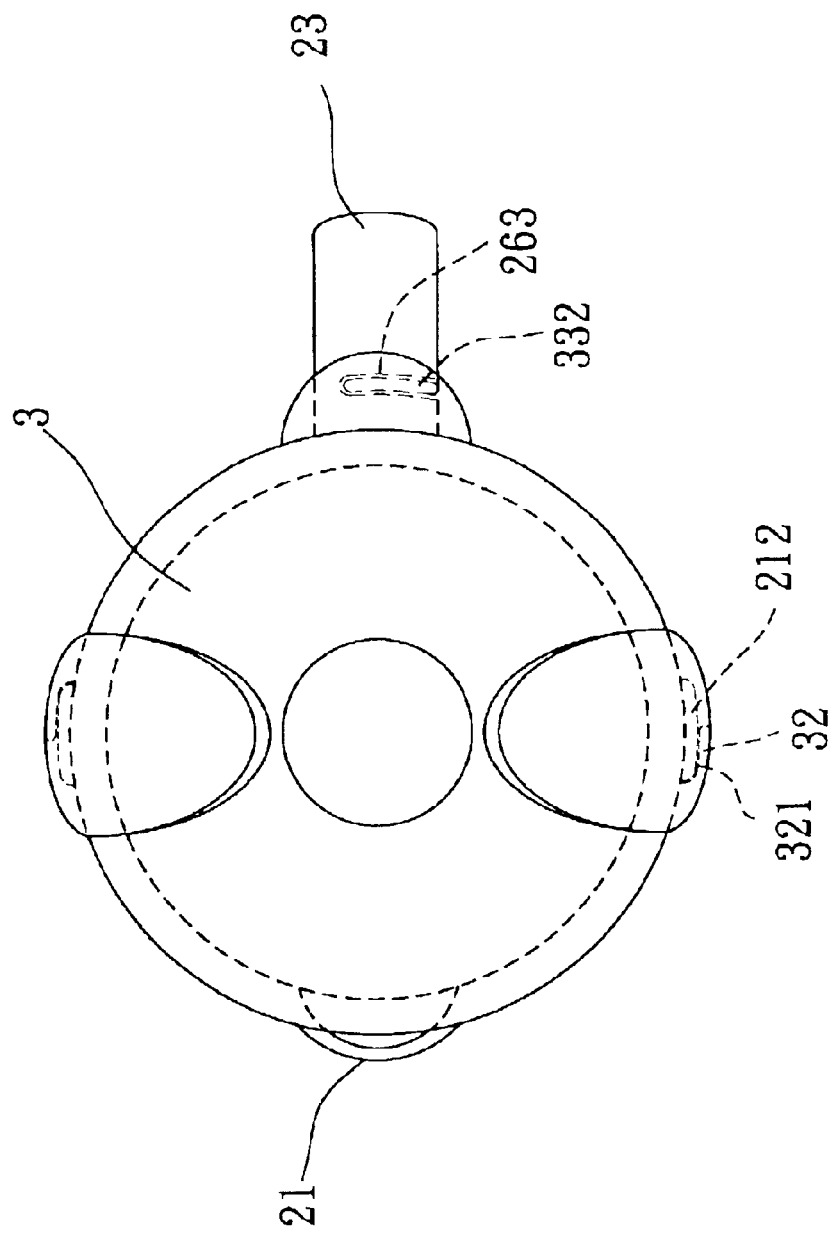
FIG. 5 is a schematic top view illustrating a top cover when disposed in a deactivating position relative to the container.

The top cover 3 includes a cover body 31 mounted removably and rotatably on the open top of the container body 21, and having a top side and a bottom side opposite to the top side. The top side of the cover body 31 is formed with a pair of finger grooves 312 to facilitate handling of the cover body 31. The bottom side of the cover body 31 is formed with a ring 311 for engaging the inner surface of the container body 21. The cover body 31 is formed with a pair of interlocking hooks 32, each of which is formed with an interlocking groove 321 for engaging a respective one of the interlocking blocks 212 on the container body 21, as best shown in FIG. 5. The hooks 32 cooperate with the blocks 212 to form an interlocking unit for locking releasably the cover body 31 onto the container body 21. The cover body 31 is provided with a switch actuating member 33 that includes a plate extension 331 extending from the rim of the cover body 31 and above the handle unit 23, and a switch actuating block 332 extending downwardly from the plate extension 331. The switch actuating block 332 is extendable into the slot 263 in the grip body 26 of the handle unit 23 so as to enable alignment and engagement between the switch actuating block 332 and the rounded engaging edge of the top rod section 432 of the push rod 43. When the switch actuating block 332 engages the top rod section 432 of the push rod 43, the push rod 43 is moved downwardly from a deactivating position (see FIG. 2) to an activating position (see FIG. 6) against biasing action of the spring 44.

Referring again to FIGS. 1 and 2, in practice, food 5, such as fruits and vegetables, is first placed in the container body 21 before the latter is mounted on the housing 11 of the motor base 1 for coupling the cutting blade unit 22 to the blade driving section 121 of the motor unit 12. The top cover 3 is then mounted on the open top of the container body 21. Initially, the switch actuating block 332 does not extend into the slot 263 such that the switch actuating block 332 is disengaged from the top rod section 432 of the push rod 43. The bottom rod section 439 of the push rod 43 does not apply a pressing force on the press button 42 such that the motor unit 12 is deactivated even if the motor control switch 13 is operated at this time.

Figure 6:
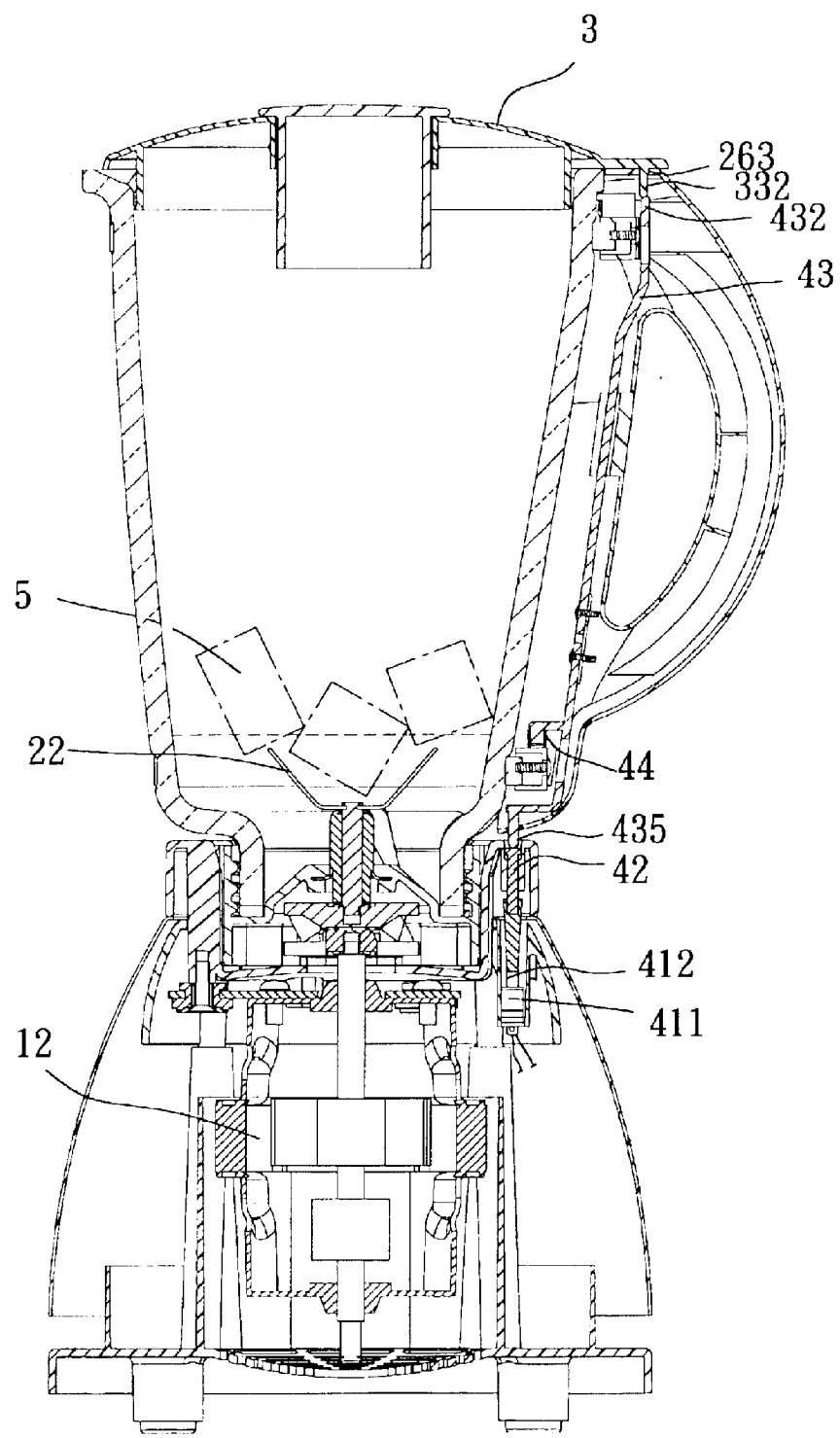
FIG. 6 is a schematic partly sectional view of the preferred embodiment, illustrating the push rod unit in an activating state.

Referring to FIGS. 5 and 6, to activate the motor unit 12, the top cover 3 is rotated relative to the container body 21 such that the switch actuating block 332 extends into the slot 263. At this time, the switch actuating block 332 engages the top rod section 432 of the push rod 43 and moves the push rod 43 downwardly against the biasing action of the spring 44 to the activating position, where the push member 435 on the bottom rod section 439 applies a pressing force for pressing the press button 42. When the press button 42 is pressed, the contact switch unit 41 is enabled to permit activation of the motor unit 12. The food 5 in the container body 21 can be processed by the cutting blade unit 22 at this time. It is noted that the interlocking unit, namely the hooks 32 and the blocks 212, ensures engagement between the switch actuating block 332 and the top rod section 432 of the push rod 43.

After use, the top cover 3 can be rotated once again relative to the container body 21 to move the switch actuating block 332 out of the slot 263. By virtue of the biasing force of the spring 44, the push rod 43 is restored to its deactivating position, where the bottom rod section 439 does not press against the press button 42 to disable the contact switch unit 41 and deactivate the motor unit 12.

Due to the configuration of the safety mechanism in the blender of this invention, the risk of injury during food processing can be reduced to a minimum.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A blender comprising:
    a motor base including a housing, a motor unit mounted in said housing and having a blade driving section disposed upwardly and outwardly of said housing, and a contact switch unit mounted in said housing and connected electrically to said motor unit, said contact switch unit including a press button which is accessible externally of said housing and which is depressible so as to permit activation of said motor unit;
    a container having an open top and a container bottom opposite to said open top and mounted removably on said housing, said container bottom being provided with a cutting blade unit that is coupled to said blade driving section when said container bottom is mounted on said housing and that is to be driven rotatably by said motor unit, said container having a spring-loaded push rod unit mounted movably thereon, said push rod unit having a bottom rod section associated operably with said press button of said contact switch unit when said container bottom is mounted on said housing, and a top rod section opposite to said bottom rod section and depressible so as to move said push rod unit against biasing action from a deactivating position to an activating position, where said bottom rod section applies a pressing force for pressing said press button to permit activation of said motor unit; and
    a top cover mounted removably on said open top of said container and provided with a switch actuating block that is movable relative to said container so as to engage said top rod section of said push rod unit for moving said push rod unit from said deactivating position to said activation position, wherein
        said press button is accessible from a ton side of said housing, said push rod unit including a push rod vertically and movable disposed on an outer side of said container, and a spring for biasing said push rod upwardly relative to said container, and
    a handle unit mounted on said outer side of said container and having a push rod unit mounted movably thereto,
    wherein said handle unit includes a base plate secured to said outer side of said container and cooperating with said container so as to confine a mounting space therebetween, and a grip body connected to said base place, said push rod unit being disposed in said mounting space such that said top and bottom rod sections extend out of said mounting space,
        wherein said top cover is rotatable relative to said container so as to permit alignment and engagement between said switch actuating block and said top rod section of said push rod unit;
        said grip body extends above said top rod section of said push rod unit and is formed with a slot that permits extension of said switch actuating block thereinto so as to enable alignment and engagement between said switch actuating block and said top rod section of said push rod unit.

2. The blender as claimed in claim 1, wherein said motor base further includes a motor control switch mounted on said housing and connected electrically to said motor unit and said contact switch unit.

3. The blender as claimed in claim 1, wherein said top rod section of said push rod unit is formed with a rounded engaging edge for engaging said switch actuating block.

4. The blender as claimed in claim 1, wherein said base plate is formed with a guide unit that extends into said mounting space to guide upward and downward movement of said push rod relative to said container.

5. The blender as claimed in claim 1, wherein said base plate and said push rod are formed with a limit unit disposed in said mounting space to limit upward and downward movement of said push rod relative to said container.

6. The blender as claimed in claim 1, wherein said top cover and said open top of said container are provided with an interlocking unit for locking releasably said top cover onto said container to ensure engagement between said switch actuating block and said top rod section of said push rod unit.

* * * * *